(12) United States Patent
Shieh

(10) Patent No.: US 8,612,744 B2
(45) Date of Patent: Dec. 17, 2013

(54) DISTRIBUTED FIREWALL ARCHITECTURE USING VIRTUAL MACHINES

(75) Inventor: Choung-Yaw Michael Shieh, Palo Alto, CA (US)

(73) Assignee: Varmour Networks, Inc., Santa Clara, CA (US)

( * ) Notice: Subject to any disclaimer, the term of this patent is extended or adjusted under 35 U.S.C. 154(b) by 0 days.

(21) Appl. No.: 13/363,088

(22) Filed: Jan. 31, 2012

(65) Prior Publication Data
US 2012/0210417 A1 Aug. 16, 2012

Related U.S. Application Data

(60) Provisional application No. 61/462,987, filed on Feb. 10, 2011.

(51) Int. Cl.
*H04L 29/06* (2006.01)
*G06F 21/00* (2013.01)

(52) U.S. Cl.
USPC ............................................ 713/153; 726/11

(58) Field of Classification Search
None
See application file for complete search history.

(56) References Cited

U.S. PATENT DOCUMENTS

| | | | |
|---|---|---|---|
| 7,062,566 B2 | 6/2006 | Amara et al. | |
| 7,774,837 B2 | 8/2010 | McAlister et al. | |
| 7,849,495 B1 | 12/2010 | Huang et al. | |
| 2003/0177389 A1 | 9/2003 | Albert et al. | |
| 2008/0083011 A1 | 4/2008 | McAlister et al. | |
| 2008/0155239 A1 | 6/2008 | Chowdhury et al. | |
| 2008/0301770 A1 | 12/2008 | Kinder | |
| 2010/0043068 A1* | 2/2010 | Varadhan et al. ............... | 726/15 |
| 2010/0235880 A1 | 9/2010 | Chen et al. | |
| 2011/0003580 A1 | 1/2011 | Belrose et al. | |
| 2011/0263238 A1 | 10/2011 | Riley et al. | |
| 2012/0017258 A1 | 1/2012 | Suzuki | |
| 2012/0131685 A1 | 5/2012 | Broch et al. | |
| 2012/0311575 A1 | 12/2012 | Song | |

* cited by examiner

*Primary Examiner* — Gilberto Barron, Jr.
*Assistant Examiner* — Izunna Okeke
(74) *Attorney, Agent, or Firm* — Blakely, Sokoloff, Taylor & Zafman LLP

(57) ABSTRACT

A distributed firewall of a gateway device includes at least one IO module for performing IO functionality of the distributed firewall, at least one security processing module for performing security functionality of the distributed firewall and a firewall controller for managing the IO module and the security processing module. Each of the at least one IO and security processing modules is executed within a virtual machine. In response to a packet received from an ingress interface, the at least one IO module is to identify a security processing module corresponding to a connections session associated with the packet, to transmit the packet to the identified security processing module to perform a security process on the packet, and in response to a signal received from the identified security processing module indicating that the security process has been completed, to transmit the packet to the egress interface.

18 Claims, 9 Drawing Sheets

| Session ID | Address(es) of Security Processing Module(s) (e.g., IP/MAC addresses) |
|---|---|
| ... | ... |
| ... | ... |
| ... | ... |

FIG. 5

DISTRIBUTED FIREWALL ARCHITECTURE USING VIRTUAL MACHINES

RELATED APPLICATIONS

This application claims the benefit of U.S. Provisional Patent Application No. 61/462,987, filed Feb. 10, 2011, which is incorporated by reference in its entirety.

FIELD OF THE INVENTION

Embodiments of the present invention relate generally to network security. More particularly, embodiments of the invention relate to a distributed firewall using virtual machines.

BACKGROUND

A firewall sits on a network boundary and protects a network from attacks. As the emerging of cloud computing, IT administrators are migrating their applications to run on virtual machines and move servers to multiple locations. This creates the need to protect networks from multiple network entrances, and protect the servers whether they are on virtual machines or physical hosts, in a corporate data center or in the cloud. IT administrators are also adding a lot more applications and services into their network, which demands much more processing resources for a firewall to handle the traffic. Traditional firewalls are designed to run on a single appliance, protecting one entrance to the network, and they cannot scale well to protect networks when the IT industry is moving to cloud computing.

Some of the conventional designs run multiple firewall instances on separate virtual machines, and use a central management service to manage their distributed firewall instances. However, the separation of these firewalls has one major drawback: it needs a centralized load balancer to distribute the traffic to each firewall. Without the load balancer, if a connection requires Network Address Translation (NAT), the returned traffic may go to a different firewall instance which then needs to forward the packets back to the original firewall instance. This costs either significant CPU and network resources or creates a single point of failure on the centralized load balancer.

FIG. 1 is a block diagram illustrating a traditional distributed firewall. Referring to FIG. 1, traditional distributed firewall 100 includes many firewall subsystems 101-105. Each firewall subsystem runs all the functions, including I/O function 106, security processing function 107, and service processing function 108, on a single virtual machine. There could be a central management system 109 to coordinate functions 106-108 among firewall subsystems 101-105. However, there is a major drawback to this architecture in that it needs a big firewall load balancer 110 to load balance the traffic among these firewall subsystems 101-105. This requirement creates a single point of failure and increases system cost. It also eliminates the benefit of distributed I/O functions since all traffic needs to go through the centralized firewall load balancer 110.

SUMMARY OF THE INVENTION

A method and apparatus is disclosed herein for using a distributed firewall architecture that uses virtual machines. In one embodiment, the method comprises receiving a packet at an input-output (IO) module of a firewall of a gateway device interfacing a local area network (LAN) and an external network, where the firewall includes at least one IO module for performing IO functionality of the firewall and at least one security processing module for performing security functionality of the firewall, and each of the at least one IO module and the at least one security processing module runs within a virtual machine and is managed by a firewall controller; identifying a security processing module corresponding to a connections session associated with the packet; transmitting the packet to the identified security processing module to perform a security process on the packet; and in response to a signal received from the identified security processing module indicating that the security process has been completed, the IO module transmitting the packet to a destination.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating a forwarding table according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a new method and apparatus is utilized to create distributed firewalls, which can process network traffic at multiple locations, running on virtual machines or physical hosts, and coordinate a security policy to protect the networks. Embodiments of the invention solve the major shortcoming of the conventional firewall design, and provide a scalable solution to deploy firewalls across multiple networks.

According to one embodiment, instead of creating multiple firewalls running on separate virtual machines, a new framework is utilized to separate firewall functions into separate processing modules that run on the same or different virtual machines and/or physical hosts. The firewall modules work together with a central controller of the firewall to form a scalable distributed firewall, which can support a large amount of network traffic in multiple networks and/or locations. The firewall modules could be in the form of software, hardware, or a combination of both to take advantage of hardware acceleration. The firewall modules communicate through a variety of network protocols, such as, for example, Ethernet or IP protocol.

Figure 2:
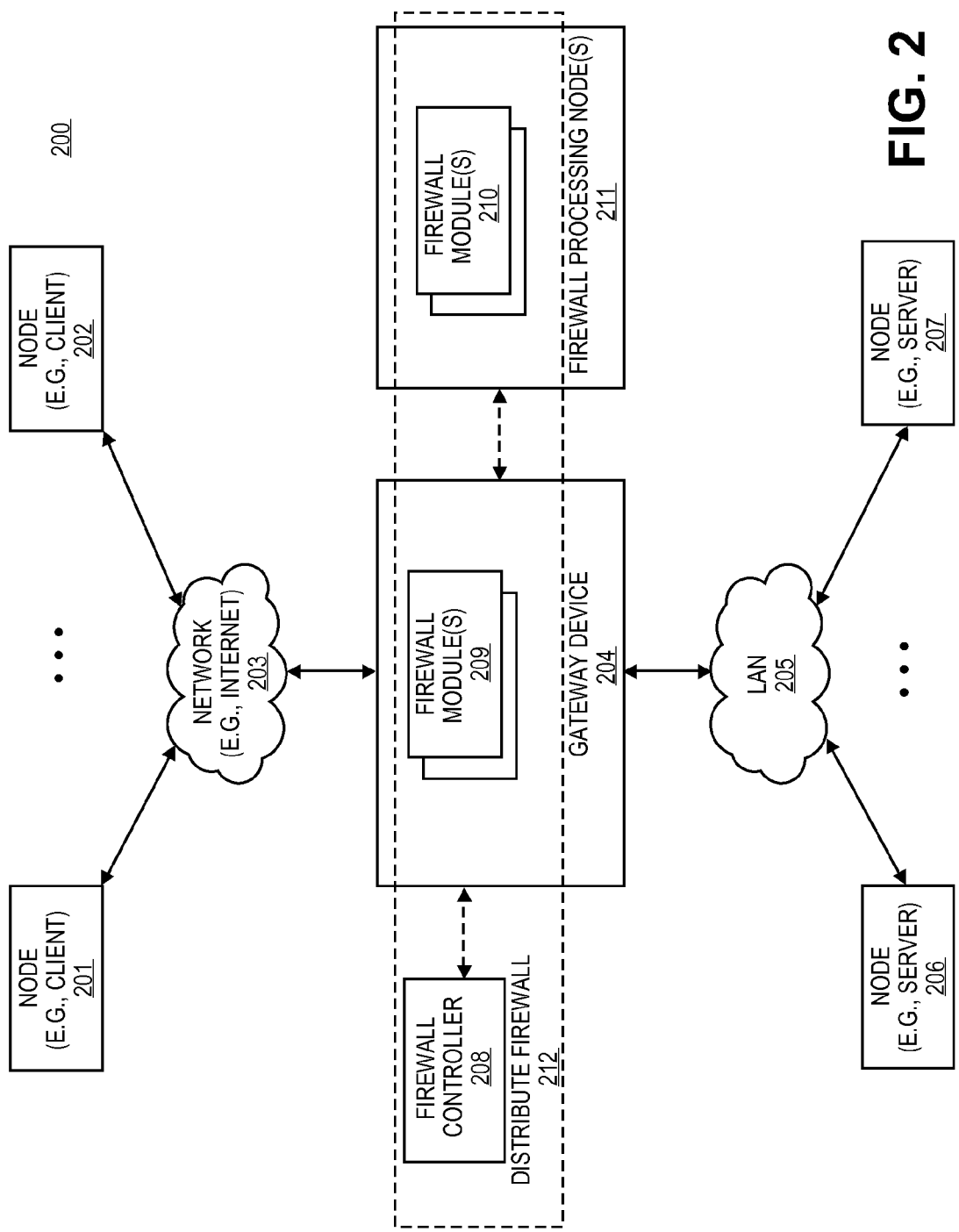
FIG. 2 is a block diagram illustrating an example of network configuration according to one embodiment of the invention.

FIG. 2 is a block diagram illustrating an example of network configuration according to one embodiment of the invention. Referring to FIG. 2, gateway device 204 (also referred to as a network element, a router, a network access device, or an access point, etc.) provides an interface between network 203 and network 205. Network 203 may be an external network such as a wide area network (WAN) (e.g., Internet) while network 205 represents a local area network (LAN). Nodes 206-207 go through gateway device 204 in order to reach nodes 201-202, or vice versa. Any of nodes 201-202 and 206-207 may be a client device (e.g., a desktop, laptop, Smartphone, gaming device) or a server.

According to one embodiment, gateway 204 is associated with a distributed firewall 212 that includes various firewall processing modules, each being executed within a virtual machine (VM). Each firewall module is responsible for performing one or more firewall functions, but it does not include all of the firewall functions. Examples of the firewall functions include, but are not limited to, network address translation (NAT), virtual private network (VPN), deep packet inspection (DPI), and/or anti-virus, etc. In one embodiment, some of the firewall processing modules are located within gateway device 204 (e.g., firewall modules 209) and some are located external to gateway device 204 (e.g., firewall modules 210 maintained by firewall processing node(s) 211. All of the firewall modules 209-210 are managed by firewall controller 208, which may be located within gateway device 204, in a public cloud associated with network 203, or in a private cloud associated with network 205. Controller 208 and firewall processing modules 209-210 collectively are referred to as distributed firewall 212.

A virtual machine represents a completely isolated operating environment with a dedicated set of resources associated therewith. A virtual machine may be installed or launched as a guest operating system (OS) hosted by a host OS. In one embodiment, a host OS represents a virtual machine monitor (VMM) (also referred to as a hypervisor) for managing the hosted virtual machines. A guest OS may be of the same or different types with respect to the host OS. For example, a guest OS may be a Windows™ operating system and a host OS may be a LINUX operating system. In addition, the guest OSes running on a host can be of the same or different types. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

Figure 3:
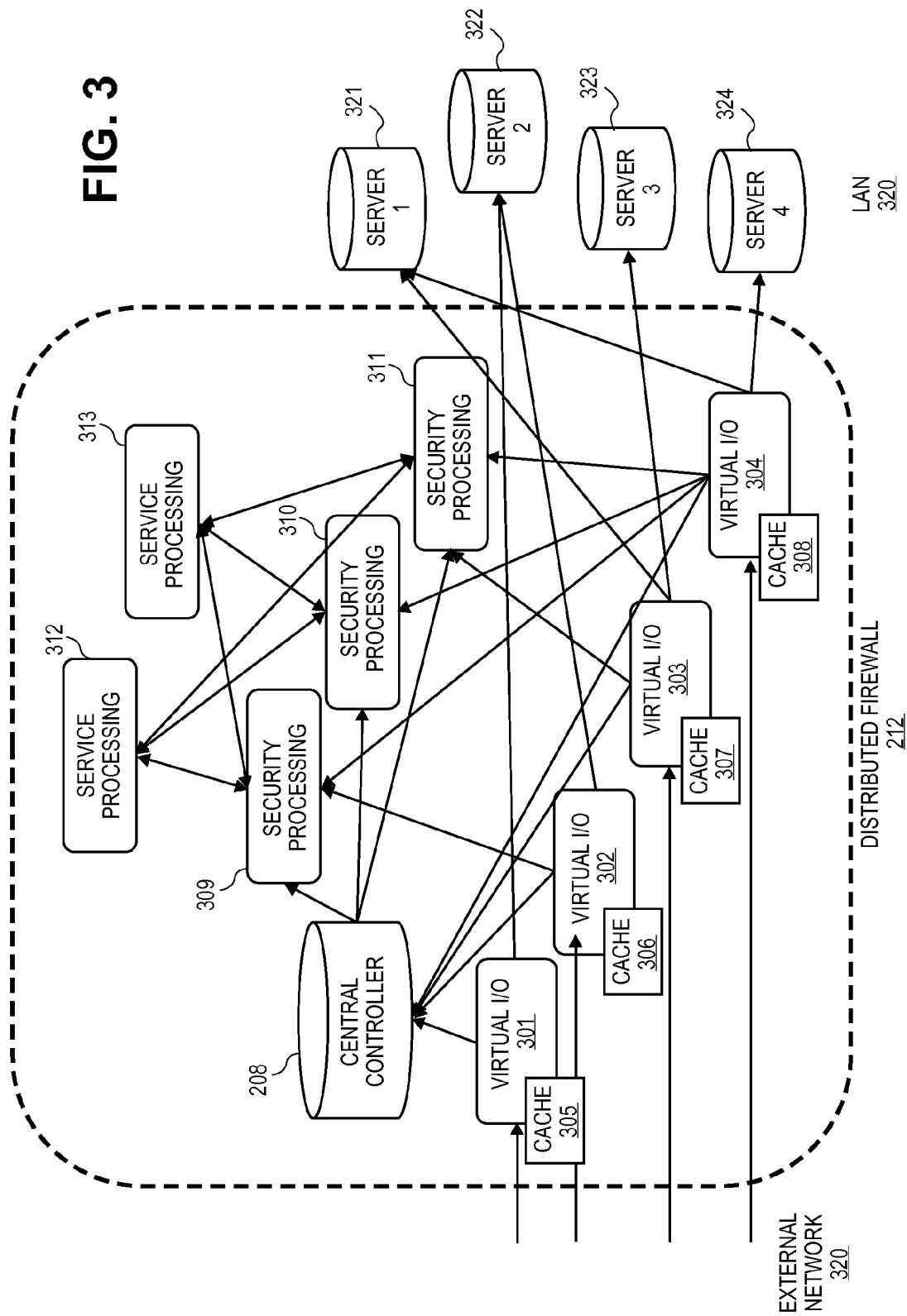
FIG. 3 is a block diagram illustrating an example of a distributed firewall according to one embodiment of the invention.

FIG. 3 is a block diagram illustrating an example of a distributed firewall according to one embodiment of the invention. Referring to FIG. 3, distributed firewall 212 includes, for the purpose of illustration, four different modules: virtual I/O modules 301-304, security processing modules 309-311, service processing modules 312-313, and central controller 208. All these modules can run on the same virtual machine, or on different virtual machines, or on same or different physical hosts. The communication protocol between the modules can use IPC (inter-process communication) if they run on the same memory space, or use layer-2 network protocol if they are on the same layer-2 network, or use IP protocols if they are connected through IP networks. Some or all of the modules 301-304 and 309-313 may be executed within a virtual machine. Dependent upon the specific configuration, each of the modules 301-304 and 309-313 may be executed by a respective virtual machine. In other configurations, multiple of modules 301-304 and 309-313 may be executed by the same virtual machine.

An I/O module running within a virtual machine is referred to herein as a virtual I/O module. Each of virtual I/O modules 301-304 receives packets from any of servers 321-324 of LAN 320 and sends packets to external network 315 outside of the firewall. Each of I/O modules 301-304 keeps a local cache (e.g., caches 305-308) storing location(s) of a security processing module(s) (e.g., security processing modules 309-311) for each connection session. A cache maintained by each I/O module contains a forwarding table mapping certain connection sessions to any of security modules 309-311. An example of a forwarding table is shown in FIG. 5. Upon receiving a packet, an I/O module performs a packet classification to find out the associated connection, and forwards the packet to the corresponding security processing module identified by the forwarding table. If it cannot find the connection in its local cache, the packets are forwarded to central controller 208 for processing. In such a case, controller 208 assigns the connection to one of security processing modules 309-311 based on one or more of a variety of factors such as load balancing. The virtual I/O modules 302-304 can locate at multiple locations of the networks to receive and send out packets.

In one embodiment, each of security processing modules 309-311 performs major security processing functions, such as NAT, VPN, DPI, and/or anti-virus, etc. A security processing module receives packets and runs the packets through one or more various security functions in the modules for security processing. There could be several security modules and each handles the same or different security functions. If the packets need to go through another security or service processing, the module sends the packets to the other modules. Optionally, it can run the packets through a load balancing mechanism to distribute the load to multiple modules. If a module is the last processing module in the chain to process the packets, it can forward the packets back to the virtual I/O module to send out, or send the packet out directly if it's configured to do so.

In one embodiment, each of service processing modules 312-313 performs one or more of the functions of security processing module, such as NAT, VPN, DPI, and/or anti-virus, etc. However, it is different from the security processing module in that it only receives and sends packets to the same security processing module. If the tasks cannot be done in a security processing module, for example, due to a resource limitation, system load, or the requirement of a different operation system, the packets can be forwarded to one or more of service processing modules 312-313 for further processing. The packets then are sent back to the same security processing module for the next security function processing. To further share the system load, any of security processing modules 309-311 can load balance the computational-intensive services to multiple service processing modules.

In one embodiment, central controller 208 is the central place to control how the packets are forwarded amongst I/O modules 301-304, security processing modules 309-311, and service processing modules 312-313. When a virtual I/O module receives a packet, according to one embodiment, it forwards the packet to central controller 208 if it cannot find an existing connection in its local cache, as shown in FIG. 5. When central controller 208 receives the packet, it decides which of the security processing modules 309-311 is able to process the packets, and then forwards the packets to the designated security processing module. It also instructs the virtual I/O module to create the local cache so the subsequent packets of the same connection session do not need to be forwarded to central controller 208; rather, they can be directly forwarded to the proper security processing module identified in the cache.

By dividing a firewall into different modules, it allows putting virtual I/O and security processing functions at the best locations to protect the network entrance, while keeping the central control and monitoring functionality at the central controller. It also enhances the scalability of the system since all modules can be expanded to multiple instances to share the system load. Note that a service processing module is optional in the architecture, as it is only required when there are needs to use additional resources to handle the security functions.

Figure 6:
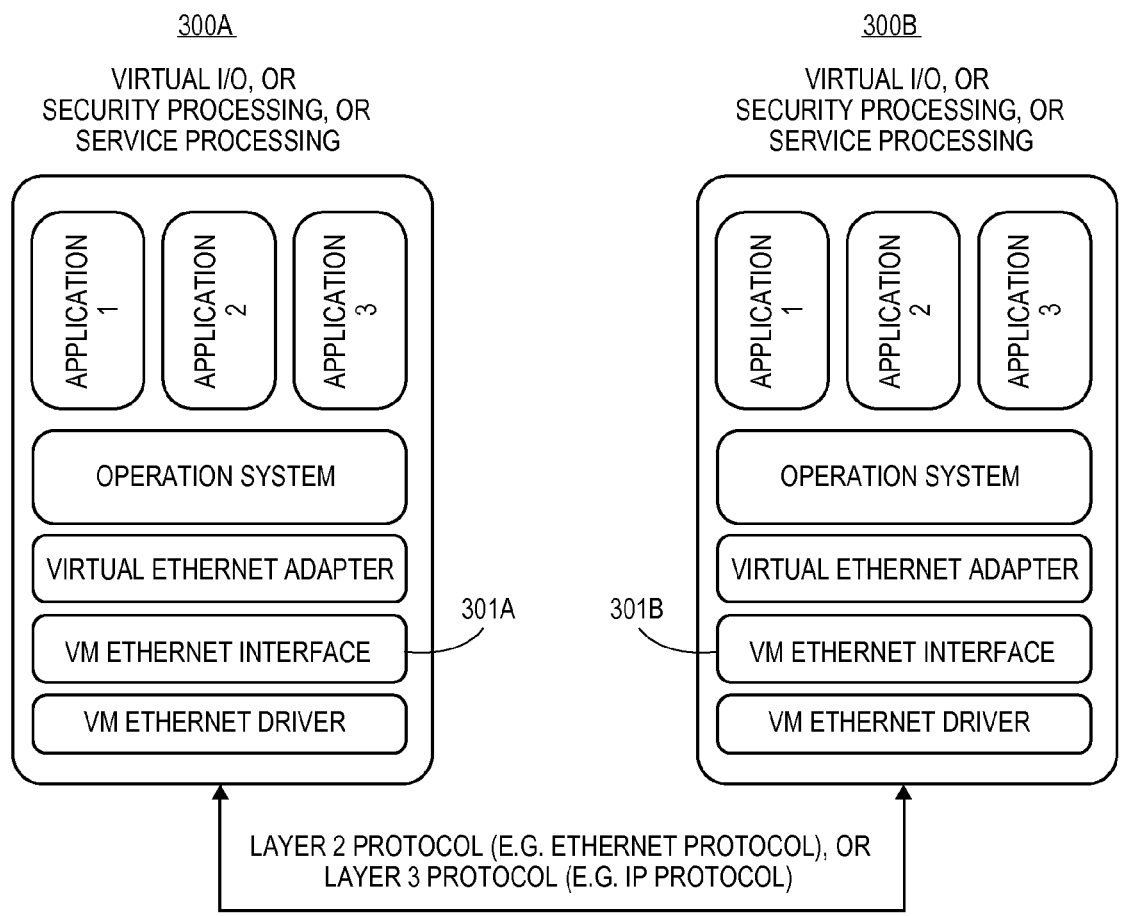
FIG. 6 is a block diagram illustrating architecture of a processing module according to one embodiment of the invention.

FIG. 6 is a block diagram illustrating architecture of a processing module according to one embodiment of the invention. Referring to FIG. 6, any of processing modules 300A and 300B can be implemented as part of any of the firewall modules (e.g., I/O module, security processing module, or service processing module) as shown in FIG. 3. In the example as shown in FIG. 6, multiple possible communication protocols can be utilized for the packet forwarding between firewall modules. If the firewall modules are on the same layer-2 networks, the packet can be forwarded through a layer-2 protocol, such as Ethernet protocol. In this example, it is assumed that each of firewall modules 300a-300B has a dedicated virtual Ethernet interface (e.g., interfaces 301A and 301B) being used for the forwarding link and the packets are sent with Ethernet header of both sides' media access control (MAC) addresses. The packets can also be forwarded in a layer-3 protocol such as an IP protocol. During the layer-3 routing, original packets are encapsulated with another IP header, which carries the IP address of both sides. The encapsulation of the outer IP address would ensure the packets are sent, and received from the proper peer.

In one embodiment, firewall modules 300A and 300B can run on virtual machines or physical hosts. Running on virtual machines provides additional benefit that a firewall module can be added dynamically. Initially the distributed firewall may have only one virtual I/O module, one security processing module, and a central controller. When there is more traffic coming, it can add more virtual I/O modules to support increasing connections. If it needs more CPU resources to handle the security processing, it may add more security processing modules and/or add more service processing modules, to support the increasing load. This provides lots of flexibility to support various network conditions.

In one embodiment, firewall modules 300A-300B could be distributed in different networks, even on different locations, as long as the modules can reach the module that is next in terms of processing and the central controller. In one embodiment, virtual I/O modules and corresponding security processing modules are in a public cloud and the central controller is in a private cloud. This configuration may provide the flexibility to secure and control packets coming from the public cloud, and allow central controller having overall view of traffic from Internet as well as from internal network.

One of the advantages of embodiments of the present invention includes, but not limited to, that the distributed firewall can employ a significantly large amount of CPU and memory resources for service processing and protect the networks at multiple geometric locations. The central controller decides which security processing module capable of processing particular connection, and is able to start a new security processing at the place deemed best for packet processing.

As a result, the location of the packet I/O is not limited on a single appliance. The I/O modules can be placed anywhere as virtual machines. The security processing power is significantly higher as packets and connections can be load balanced to any number of the security processing modules, and the modules could be added or deleted dynamically. Using such modules in a firewall cloud provides a security design that is best-fit for the emerging cloud computing, and provides great scalability and system availability.

Figure 7:
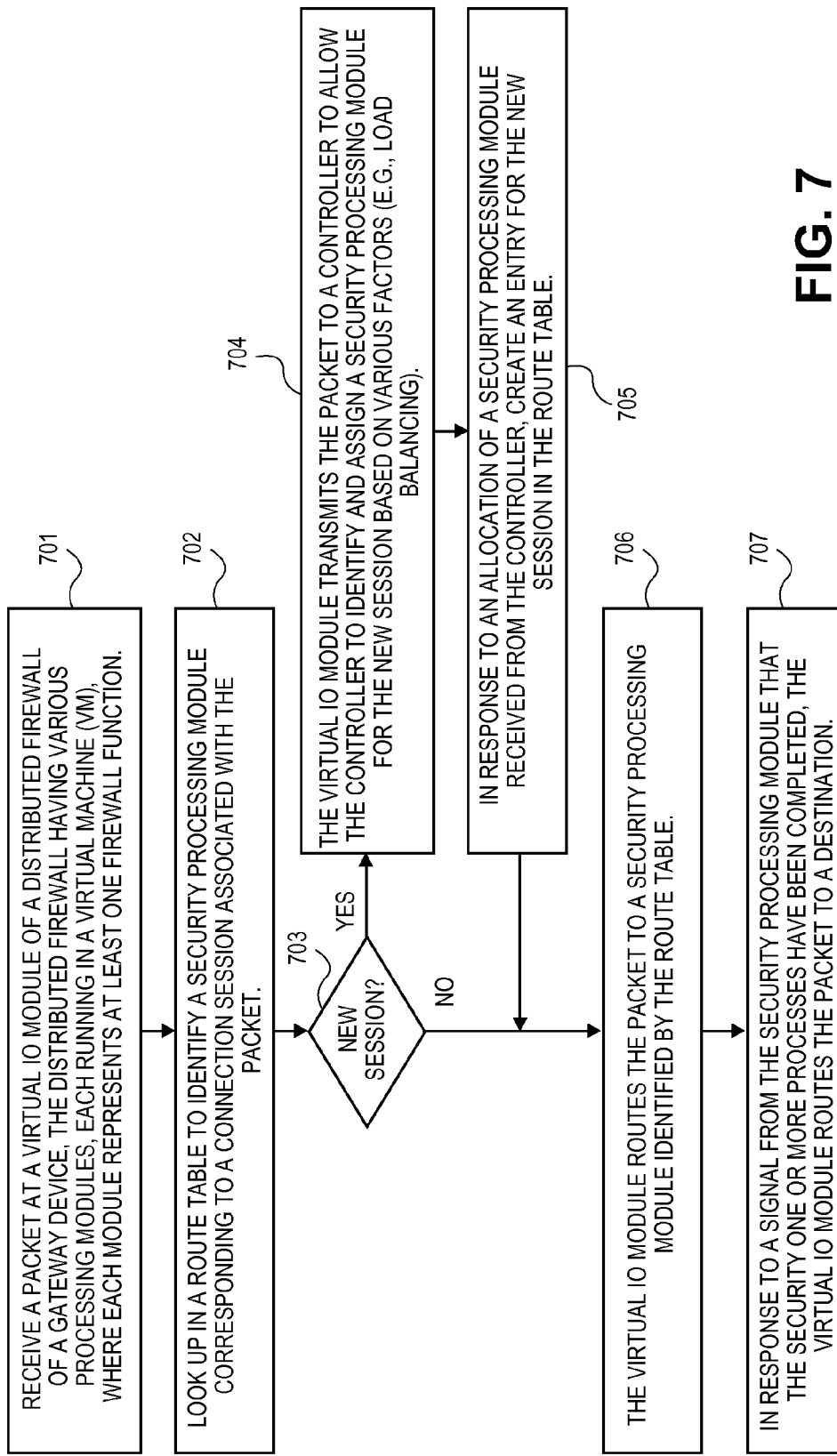
FIG. 7 is a flow diagram illustrating a method for performing firewall operations using a distributed firewall according to one embodiment of the invention.

FIG. 7 is a flow diagram illustrating a method for performing firewall operations using a distributed firewall according to one embodiment of the invention. Method 700 may be performed by processing logic that may include software, hardware, or a combination of both. For example, method 700 may be performed by distributed firewall 212 of FIG. 2. Referring to FIG. 7, at block 701, a packet is received at a virtual IO module of a distributed firewall of a gateway device. The distributed firewall includes various processing modules, such as IO modules, security processing modules, and service processing modules. One or more of such modules can be executed within a virtual machine distributed over one or more networks (e.g., public cloud and/or private cloud) and managed by a controller. Each module is responsible for handling one or more firewall functions. These modules may be running within the gateway device or distributed amongst several network nodes. These modules communicate with each other in a mesh manner using a variety of communications protocols (e.g., layer-2 or layer-3 routing).

In response to the packet, processing logic looks in a forwarding table to identify a security processing module corresponding to a connection session associated with the packet. As described above, the forwarding table includes one or more entries, each mapping a connection session with an address or identifier (ID) of a security processing module. The forwarding table may be cached or maintained by the IO module. If no entry corresponding to the packet is found in the route table at block 703, the packet is determined to be associated with a new session. In such a situation, at block 704, the IO module forwards the packet to a controller to allow the controller to allocate a security processing module to the new session. The controller can allocate one of the existing security modules to the new session or alternatively, it can spawn a new security module (e.g., a new virtual machine), dependent upon a variety of factors such as load balancing.

In response to an allocation of a security processing module received from the controller, at block 705, the IO module creates a new entry in the forwarding table mapping the new session with the assigned security processing module. The forwarding table may be maintained within the IO module or alternatively in a database accessible by the IO module. At block 706, the IO module routes the packet to a security processing module identified by the forwarding table. Note that the selected security module may further offload one or more of the security processes to one or more service processing modules dependent upon the specific bandwidth of the selected security processing module as described above. Once the security processing module has complete all of the security processes based on a security policy associated with the session, at block 707, the IO module forwards the packet to the destination.

Figure 4:
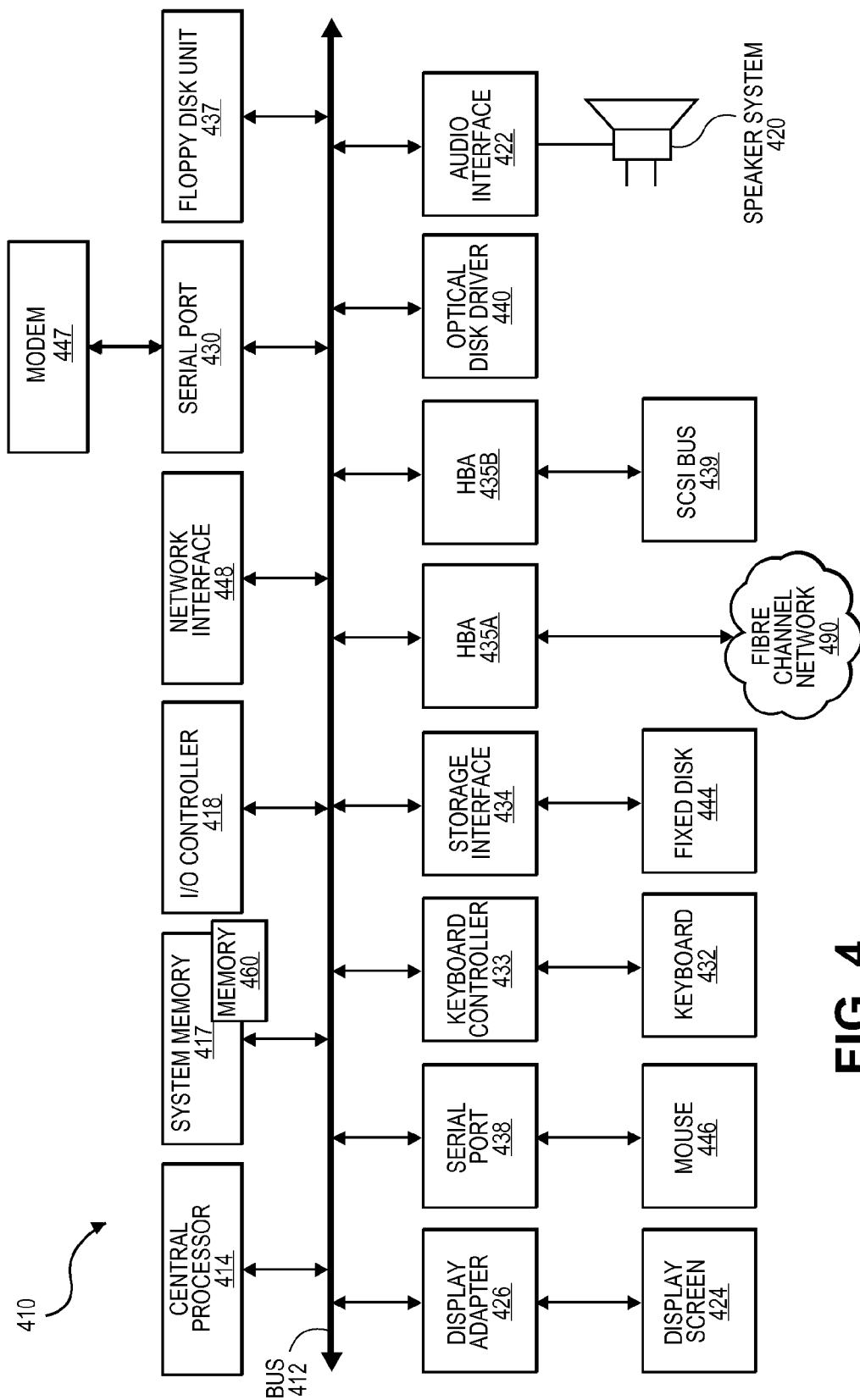
FIG. 4 is a block diagram illustrating an example of a data processing system which may be used as an embodiment of the invention.

FIG. 4 is a block diagram illustrating an example of a data processing system which may be used as an embodiment of the invention. For example, system 410 may be implemented as part of gateway device 204 or alternatively, system 410 may be implemented as part of a client or server device. In one embodiment, system 410, which may operate as a gateway device, includes a memory, a second interface to receive one or more packets from the one or more virtual machines, and one or more processors. Referring to FIG. 4, gateway 410 includes a bus 412 to interconnect subsystems of gateway 410, such as a processor 414, a system memory 417 (e.g., RAM, ROM, etc.), an input/output controller 418, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems.

Modem 447 may provide a direct connection to a remote server via a telephone link or to the Internet via an internet service provider (ISP). Network interface 448 may provide a direct connection to a remote server. Network interface 448 may provide a direct connection to a remote server via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the gateway operations described herein can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

Figure 8:
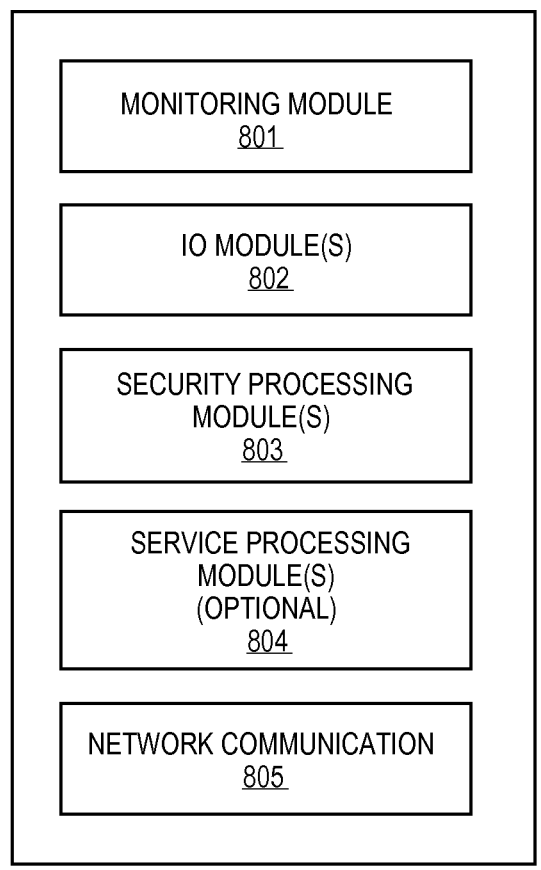
FIG. 8 illustrates a set of code (e.g., programs) and data that is stored in memory of one embodiment of a security gateway according to one embodiment.

FIG. 8 illustrates a set of code (e.g., programs) and data that is stored in memory of one embodiment of a security gateway, such as the security gateway set forth in FIG. 4. The security gateway uses the code, in conjunction with a processor, to implement the necessary operations (e.g., logic operations) to implement the described herein.

Referring to FIG. 8, the memory 460 includes a monitoring module 801 which when executed by a processor is responsible for performing traffic monitoring of traffic from the VMs as described above. Memory 460 also stores one or more IO modules 802 which, when executed by a processor, is responsible for forwarding inbound and outbound packets. Memory 460 further stores one or more security processing modules 803 which, when executed by a processor, is responsible for security processes on the packets provided by IO modules 802. Memory 460 also stores one or more optional service processing modules 804, which when executed by a processor performs a particular security process on behalf of security processing modules 803. The memory also includes a network communication module 805 used for performing network communication and communication with the other devices (e.g., servers, clients, etc.).

Figure 1:
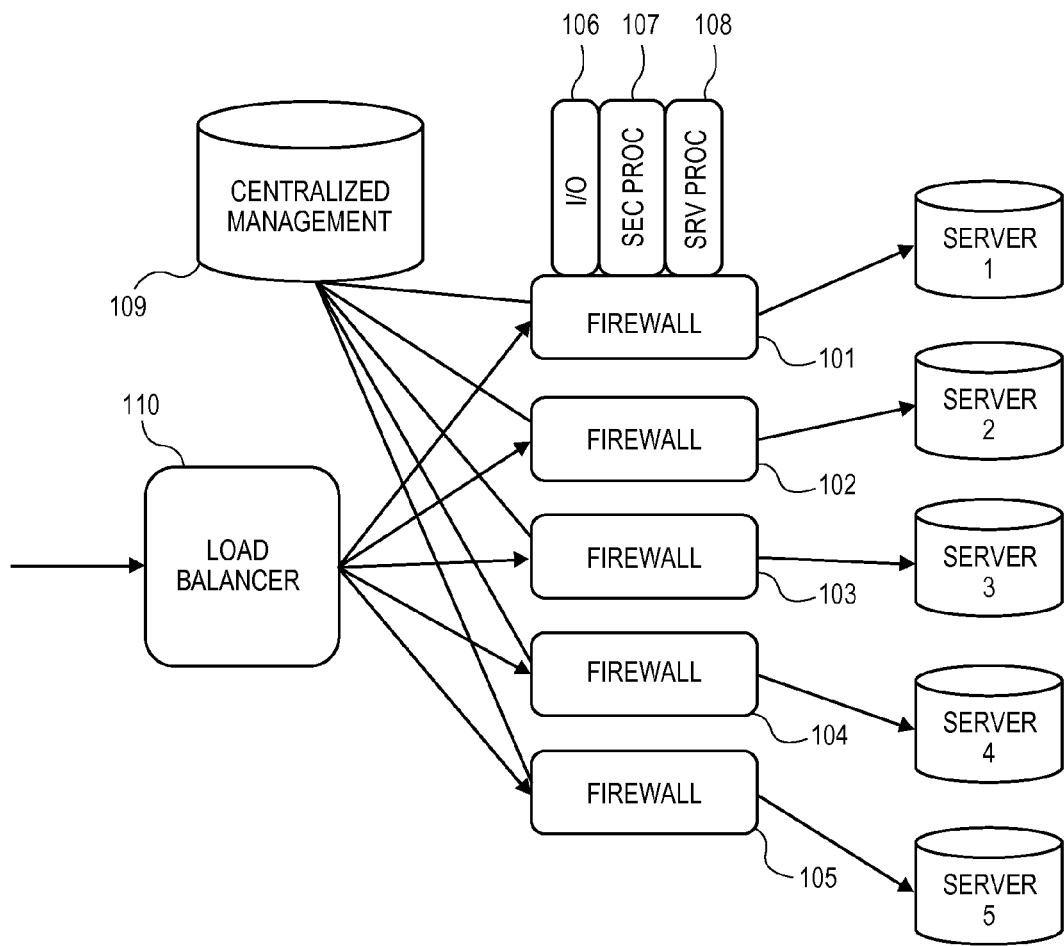
FIG. 1 is a block diagram illustrating a traditional distributed firewall.

As described above, the servers in FIG. 1 may be implemented using a computer system. In one embodiment, one or more of the servers is implemented using a system such as depicted in FIG. 4 as well, except using different code to implement the techniques and operations performed by such servers and their VMs as described above. The code is stored in computer-readable storage medium such as system memory 417, fixed disk 444, optical disk 442 or floppy disk 448.

Figure 9:
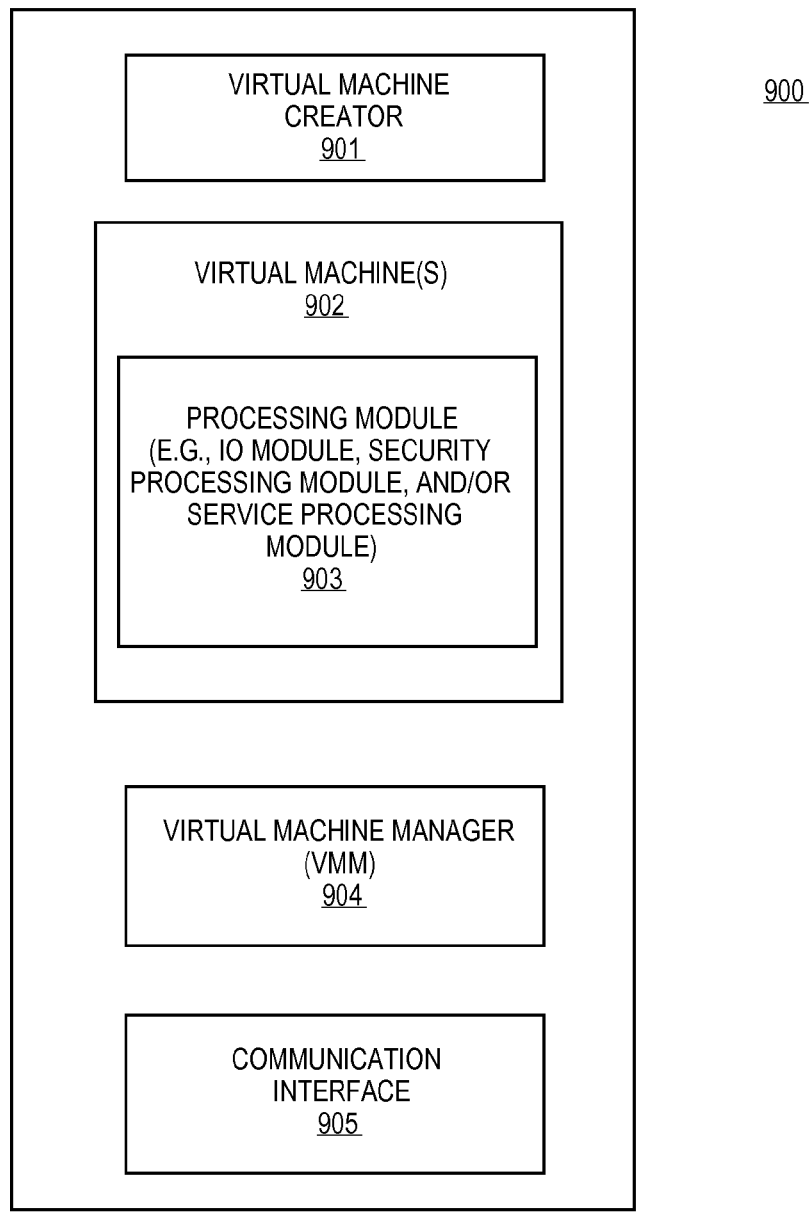
FIG. 9 illustrates a set of code (e.g., programs) and data that is stored in memory according to one embodiment.

FIG. 9 illustrates a set of code (e.g., programs) and data that is stored in one of those memories. In one embodiment of the server, such as implemented using the system shown in FIG. 4. The server uses the code, in conjunction with the processor, to implement the necessary operations to implement the discovery process depicted above, such as, for example, the operation set forth in FIG. 7. Referring to FIG. 9, the memory 900 includes virtual machine creation module 901 which when executed by a processor is responsible for creating a virtual machine on the server in a manner well-known in the art. Memory 900 also includes one or more virtual machines 902 which may be created by virtual machine creator 901. Virtual machine 902 includes a processing module 903 executed therein, which can be one or more of an IO module, a security processing module, and/or a service processing module. Memory 600 further includes virtual machine manager (VMM) 904 responsible for managing virtual machines 902. Memory 600 also includes communication interface module 605 used for performing communication with other devices (e.g., security gateway, servers, clients, etc.).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving a packet at an input-output (IO) module of a firewall of a gateway device interfacing a local area network (LAN) and an external network, the firewall including at least one IO module for performing IO functionality of the firewall and at least one security processing module for performing security functionality of the firewall, each of the at least one IO module and the at least one security processing module running within a first virtual machine and managed by a firewall controller;
   identifying a security processing module corresponding to a connections session associated with the packet, the identified security processing module running within a second virtual machine, wherein the identified security processing module is operable to offload, in response to detection of a processing limitation of the identified security processing module, at least one security process to a service processing module to perform at least one particular security service, the service processing module being run within a third virtual machine running on a physical host separated from the second virtual machine running on a different physical host executing the identified security processing module;
   transmitting the packet to the identified security processing module running within the second virtual machine to perform a security process on the packet; and
   in response to a signal received from the identified security processing module running within the second virtual machine indicating that the security process has been completed, the IO module running within the first virtual machine transmitting the packet to a destination.

2. The method of claim 1, wherein at least one security processing module is located external to the gateway device and communicatively coupled to the IO module.

3. The method of claim 1, wherein at least one security processing module is located in a public cloud associated with the external network while the firewall controller is located in a private cloud associated with LAN.

4. The method of claim 1, wherein the at least one security process includes network address translation (NAT) process, a virtual private network (VPN) process, a deep packet inspection (DPI) process, or an anti-virus process.

5. The method of claim 1, further comprising transmitting the packet to the firewall controller if there is no security processing module currently associated with the connection session of the packet to allow the controller to assign a first security processing module to the connection session.

6. The method of claim 5, further comprising allocating and launching by the firewall controller the first security processing module if there is no existing security processing module that has enough bandwidth to perform the security processes of the packet.

7. A computer-readable storage medium having instructions stored therein, which when executed by a computer, cause the computer to perform a method, the method comprising:
   receiving a packet at an input-output (IO) module of a firewall of a gateway device interfacing a local area network (LAN) and an external network, the firewall including at least one IO module for performing IO functionality of the firewall and at least one security processing module for performing security functionality of the firewall, each of the at least one IO module and the at least one security processing module running within a first virtual machine, and managed by a firewall controller or run on the same or separate physical devices;
   identifying a security processing module corresponding to a connections session associated with the packet, the identified security processing module running within a second virtual machine, wherein the identified security processing module is operable to offload, in response to detection of a processing limitation of the identified security processing module, at least one security process to a service processing module to perform at least one particular security service, the service processing module being run within a third virtual machine running on a physical host separated from the second virtual machine running on a different physical host executing the identified security processing module;
   transmitting the packet to the identified security processing module running within the second virtual machine to perform a security process on the packet; and
   in response to a signal received from the identified security processing module running within the second virtual machine indicating that the security process has been completed, the IO module running within the first virtual machine transmitting the packet to a destination.

8. The computer-readable storage medium of claim 7, wherein at least one security processing module is located external to the firewall controller and communicatively coupled to the IO module.

9. The computer-readable storage medium of claim 7, wherein at least one security processing module is located in a public cloud associated with the external network while the firewall controller is located in a private cloud associated with LAN.

10. The computer-readable storage medium of claim 7, wherein the at least one security process includes at least one of a network address translation (NAT) process, a virtual private network (VPN) process, a deep packet inspection (DPI) process, and an anti-virus process.

11. The computer-readable storage medium of claim 7, wherein the method further comprises transmitting the packet to the firewall controller if there is no security processing module currently associated with the connection session of the packet to allow the controller to assign a first security processing module to the connection session.

12. The computer-readable storage medium of claim 11, wherein the method further comprises allocating and launching by the firewall controller the first security processing module if there is no existing security processing module that has enough bandwidth to perform the security processes of the packet.

13. A gateway device, comprising:
an ingress interface;
an egress interface; and
a distributed firewall coupled to the ingress and egress interfaces, the distributed firewall including
at least one IO module for performing IO functionality of the distributed firewall within a first virtual machine,
at least one security processing module for performing security functionality of the distributed firewall, each of the at least one IO module and the at least one security processing module running within virtual machines, and
a firewall controller for managing the at least one IO module and the at least security processing module,
wherein in response to a packet received from an ingress interface, the at least one IO module running within the first virtual machine is to identify a security processing module, which is running within a second virtual machine, corresponding to a connections session associated with the packet, to transmit the packet to the identified security processing module running within the second virtual machine to perform a security process on the packet, and in response to a signal received from the identified security processing module indicating that the security process has been completed, to transmit the packet to the egress interface by the at least one IO module running within the first virtual machine, wherein the identified security processing module is operable to offload, in response to detection of a processing limitation of the identified security processing module, at least one security process to a service processing module to perform at least one particular security service, the service processing module being run within a third virtual machine running on a physical host separated from the second virtual machine running on a different physical host executing the identified security processing module.

14. The gateway device of claim 13, wherein at least one security processing module is located external to the gateway device and communicatively coupled to the IO module.

15. The gateway device of claim 13, wherein at least one security processing module is located in a public cloud associated with an external network while the firewall controller is located in a private cloud associated with a local area network (LAN).

16. The gateway device of claim 13, wherein the at least one security process includes at least one of a network address translation (NAT) process, a virtual private network (VPN) process, a deep packet inspection (DPI) process, and an anti-virus process.

17. The gateway device of claim 13, wherein the IO module is to transmit the packet to the firewall controller if there is no security processing module currently associated with the connection session of the packet to allow the controller to assign a first security processing module to the connection session.

18. The gateway device of claim 17, wherein the firewall controller is to allocate and launch the first security processing module if there is no existing security processing module that has enough bandwidth to perform the security processes of the packet.

* * * * *